March 14, 1961 H. H. BUCK 2,974,971
PICK-UP DEVICE FOR HAULING LEAVES, ETC.
Filed June 15, 1959 2 Sheets-Sheet 2
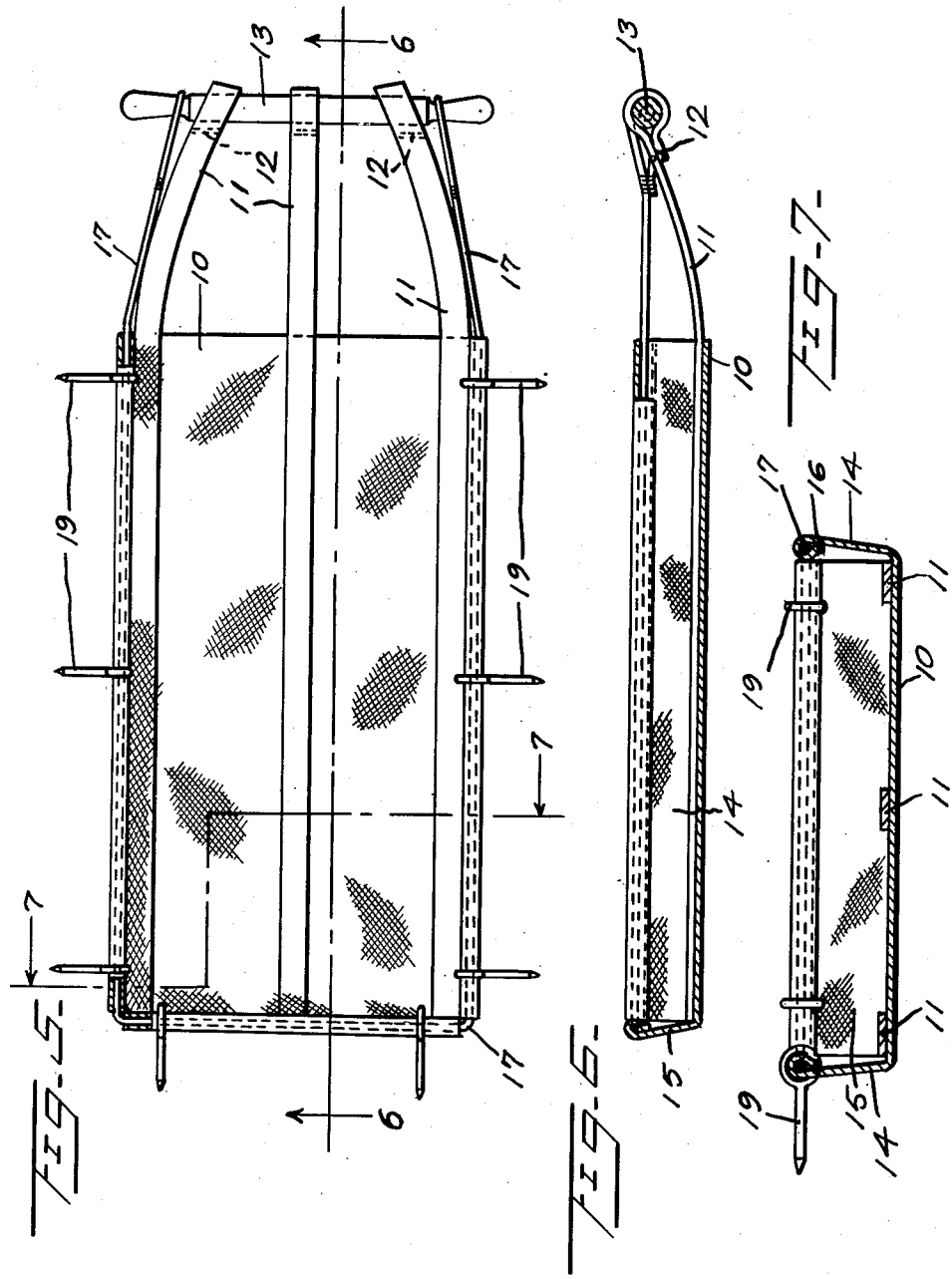
HERMAN H. BUCK
INVENTOR
ATTORNEYS.

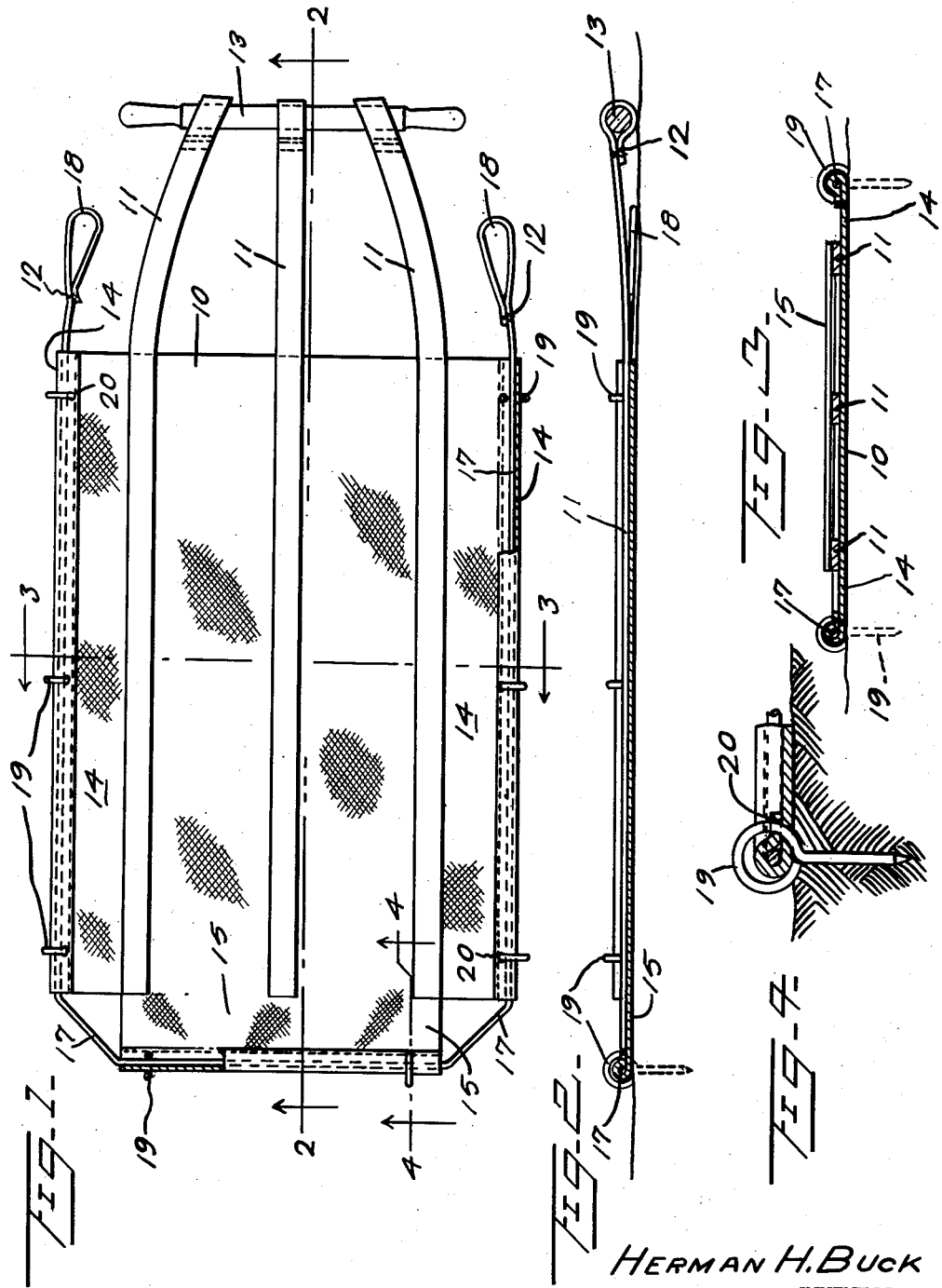

United States Patent Office 2,974,971
Patented Mar. 14, 1961

2,974,971
PICK-UP DEVICE FOR HAULING LEAVES, ETC.
Herman H. Buck, 805 SW. 4th St., Grand Rapids, Minn.
Filed June 15, 1959, Ser. No. 820,545
2 Claims. (Cl. 280—19)

This invention relates to a pick-up-device for hauling leaves, pine cones, small branches, etc., off lawns, parks, cemeteries and golf courses.

It is an object of this invention to provide a pick-up device for hauling leaves, which can be moved over a lawn without damaging the grass on the latter.

It is another object of the present invention to provide a pick-up device for hauling leaves, etc., which can be easily and quickly loaded and unloaded.

It is a still further object of the present invention to provide a pick-up device for hauling leaves, etc., which is collapsible to facilitate storing in a small space, when not in use.

Additional objects, advantages and improvements according to the present invention will become apparent from the following specification, taken in connection with the accompanying drawing, in which:

Figure 1 is a top plan view of the pick-up device according to the present invention.

Fig. 2 is a longitudinal detail sectional view on section line 2—2 of Fig. 1, showing certain details of the traction straps and one of the side wings.

Fig. 3 is a transverse sectional view on section line 3—3 of Fig. 1, also showing details of the traction straps.

Fig. 4 is a detail sectional view on the section line 4—4 of Fig. 1, showing one of the pins for securing the side wings to the ground.

Fig. 5 is a view similar to Fig. 1, but showing the side wings and end wing in vertical position.

Fig. 6 is a longitudinal sectional view on the section line 6—6 of Fig. 5, showing the interior of the pick-up device.

Fig. 7 is a transverse sectional view on the section line 7—7 of Fig. 5, also showing the interior of the pick-up device.

Referring to the drawings in detail and to Figs. 1 and 5 in particular, the reference numeral 10 designates the main body of the pick-up device in the form of a mat, this mat being a piece of canvas cloth or suitable plastic material. Spaced inwardly from the edges of the mat 10, and also centrally thereof, there are three (3) traction straps 11, which are secured to the main body of the mat in any suitable manner, as by an adhesive or cement. At their forward ends, these ends are turned back and secured to the main bodies of the straps by stitching 12 to form aligned loops through which a pull handle 13 extends.

The sections of the main body of the mat 10 beyond the outermost traction straps 11, form side wings 14; likewise the rear portion of the main body 10, beyond the ends of the traction straps 11, forms a rear wing 15. The rear corners between the rear wing 15 and the respective side wings 14—14 are cut away for a purpose that will appear hereinafter. The side wings 14—14 and rear wing 15 have their outer edges rolled back and secured to the main body member by stitching 16 to form a peripheral channel which extends along both sides and the rear of the pick-up device. In the peripheral channel there is positioned a strap 17, having loops 18 as its ends. The length of this strap 17 is so selected that when the loops 18—18 are placed over the outer ends of the pull handle 13, the side wings 14—14 and the rear end wing 15 on the main body 10 of the mat will be in their vertical positions.

Provision is made so that the mat 10 can be kept flat on the ground while being loaded, notwithstanding the wind blowing, children playing or animals cavorting around. At uniformly spaced intervals along the edges of the side wings 14—14 and the rear wing 15, there are positioned eye pins 19, which extend through suitable holes 20 in the side and end wings.

The use of the pick-up device according to the present invention is believed to be readily apparent from the preceding description. The main body 10 of the mat is spread out flat on the ground, with the loops 18 on the ends of the strap 17 disengaged from the pull handle 13, and the side wings 14—14 and rear wing 15 also spread flat on the ground. The eye pins 19 may be positioned in the ground, as shown in Fig. 4, to hold the side and end wings in their flat positions. The pick-up device is then loaded with the rubbish to be hauled away, such as leaves, pine cones, small branches, etc.

The loops 18—18 on the straps 17 are now drawn forward and engaged over the respective ends of the pull handle 13 to pull the side wings 14—14 and the rear wing 15 into their vertical positions. The loaded pick-up device may now be easily hauled away.

Having now fully described my invention, what I claim as new and useful and desire to secure by Letters Patent in the United States is:

1. A pick-up device comprised by a bottom mat section, traction straps secured adjacent the side edges of the bottom mat section and extending beyond one end of same, a pull handle secured to the outer ends of the traction straps, flexible wings on the bottom mat section positioned outwardly of said traction straps and a flexible wing on the bottom mat section at the other end of same, and a pull strap secured freely in the outer edges of said side and end wings and adapted to be engaged over said pull handle to pull said side wings into vertical positions.

2. A pick-up device comprised by a bottom mat section, a pair of traction straps secured to said bottom mat section spaced inwardly from and parallel to the sides of the latter and at one end terminating short of one end of said mat section and at their other ends extending beyond the other end of the mat section and having closed loops thereon, a third traction strap secured to said bottom mat section positioned intermediate the other two straps and also terminating at one end short of the first end of the mat section and at its other end extending beyond the latter end of the mat section and also having a loop thereon, a pull handle positioned in the closed loops on said traction straps, said mat section being cut away at the corners of the first end outwardly of the sides of the respective members of the pair of traction straps and outwardly of the first ends of the respective members of the pair of traction straps, and being formed with closed loops in its sides parallel to the respective members of the pair of traction straps and at its first end, a pull strap through the closed loops of said mat section having loops on its opposite ends and being of such length that, when said loops are engaged over the opposite ends of the pull handle, the sides of the mat section beyond the respective members of the pair of traction straps and the first end of the mat section will be drawn into vertical positions.

References Cited in the file of this patent
UNITED STATES PATENTS

| | | |
|---|---|---|
| 493,680 | Bunker | Mar. 21, 1893 |
| 1,656,701 | Eustace | Jan. 17, 1928 |
| 1,826,937 | Jensen | Oct. 13, 1931 |
| 2,424,694 | Jones | July 29, 1947 |

FOREIGN PATENTS

| | | |
|---|---|---|
| 319,810 | Germany | Mar. 31, 1920 |
| 118,956 | Sweden | Apr. 15, 1947 |